United States Patent
Thom et al.

(10) Patent No.: US 8,700,893 B2
(45) Date of Patent: Apr. 15, 2014

(54) KEY CERTIFICATION IN ONE ROUND TRIP

(75) Inventors: Stefan Thom, Snohomish, WA (US); Scott D. Anderson, Kirkland, WA (US); Erik L. Holt, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 833 days.

(21) Appl. No.: 12/607,937

(22) Filed: Oct. 28, 2009

(65) Prior Publication Data

US 2011/0099367 A1    Apr. 28, 2011

(51) Int. Cl.
*H04L 9/00* (2006.01)
*H04L 9/32* (2006.01)

(52) U.S. Cl.
USPC ........... 713/156; 713/176; 713/155; 713/189; 726/3

(58) Field of Classification Search
USPC ................. 713/156, 176, 155, 189; 726/3
See application file for complete search history.

(56) References Cited

U.S. PATENT DOCUMENTS

| | | | |
|---|---|---|---|
| 2005/0223007 A1* | 10/2005 | Zimmer et al. | 707/9 |
| 2005/0289343 A1 | 12/2005 | Tahan | |
| 2005/0289347 A1 | 12/2005 | Ovadia | |
| 2006/0117181 A1 | 6/2006 | Brickell | |
| 2006/0277414 A1 | 12/2006 | Kotani et al. | |
| 2007/0016801 A1* | 1/2007 | Bade et al. | 713/193 |
| 2008/0126802 A1 | 5/2008 | Li et al. | |
| 2009/0097642 A1 | 4/2009 | Schnell et al. | |
| 2009/0169012 A1 | 7/2009 | Smith et al. | |
| 2009/0271618 A1* | 10/2009 | Camenisch et al. | 713/155 |

FOREIGN PATENT DOCUMENTS

| | | |
|---|---|---|
| CN | 1457170 A | 11/2003 |
| WO | 03073688 A1 | 9/2003 |
| WO | 2008031148 A1 | 3/2008 |
| WO | 2008115988 A1 | 9/2008 |

OTHER PUBLICATIONS

"International Search Report and Written Opinion of the International Searching Authority", Mailed Date: Jun. 20, 2011, Application No. PCT/US2010/050285, Filed Date: Sep. 24, 2010, 8 pages.
Myers, et al., "Certificate Management Messages over CMS", Retrieved at <<http://cnscenter.future.co.kr/resource/ietf/rfc/rfc2797.pdf>>, Apr. 2000, 33 pages.

(Continued)

*Primary Examiner* — Brandon Hoffman
*Assistant Examiner* — Samuel Ambaye
(74) *Attorney, Agent, or Firm* — Tony Azure; Andrew Sanders; Micky Minhas

(57) ABSTRACT

Certification of a key, which a Trusted Platform Module (TPM) has attested as being non-migratable, can be performed in a single round trip between the certificate authority (CA) and the client that requests the certificate. The client creates a certificate request, and then has the TPM create an attestation identity key (AIK) that is bound to the certificate request. The client then asks the TPM to sign the new key as an attestation of non-migratability. The client then sends the certificate request, along with the attestation of non-migratability to the CA. The CA examines the certificate request and attestation of non-migratability. However, since the CA does not know whether the attestation has been made by a trusted TPM, it certifies the key but includes, in the certificate, an encrypted signature that can only be decrypted using the endorsement key of the trusted TPM.

20 Claims, 7 Drawing Sheets

(56) References Cited

OTHER PUBLICATIONS

Morozov, et al., "Hardware Key for Information Systems Users Authentification", Retrieved at <<http://ieeexplore.ieee.org/stamp/stamp.jsp?arnumber=01366012>>, TCSET'2004; Feb. 24-28, 2004, Lviv-Slavsko, Ukraine, pp. 420-421.

George, Patrick, "User Authentication with Smart Cards in Trusted Computing Architecture.", Retrieved at <<http://www.gemplus.com/smart/rd/publications/pdf/SAM2406.pdf>>, Proceedings of the International Conference on Security and Management (SAM'04), Jun. 21-24, 2004, 7 pages.

List of References cited in Chinese Office Action, Doc. No. CPPH1132283P, dated May 2, 2013, 1 page.

* cited by examiner

KEY CERTIFICATION IN ONE ROUND TRIP

BACKGROUND

The use of cryptographic keys involves trust. When A encrypts data with B's key, A expects that only B will be able to decrypt the data. And when A verifies a signature that was created with B's key, A expects the existence of a valid signature to mean that B actually signed the data over which the signature was calculated. Therefore, when A uses B's key, it is legitimate for A to want to know how A can be sure that B's key really belongs to B, and how can A be sure that B's key has not been compromised.

Trust in keys is generally established through certificates. When an entity creates a key, the entity submits the key to an authority for certification. The authority determines whether the key and its owner meet the authority's standards for certification. If so, the authority issues a certificate for the key, which contains the key signed by the authority. Authorities are entities that are known to the community that they serve, and that the community trusts to certify the keys of other entities. If a recognized authority certifies a key, then the community that trusts the authority will trust the certified key. For example, browsers periodically receive updated lists of authorities, and the browsers will trust certificates issued by authorities on the list. An organization (e.g., a company) may have a certificate authority that is recognized and trusted by machines within that organization.

A trusted platform module (TPM) is a piece of hardware that can be used to provide various forms of security for a machine. One thing that a TPM can do is maintain hardware security around a key, thereby providing a high measure of assurance that the key will not be misused. In some cases, a certificate authority may be willing to certify only a key that is bound to a particular TPM, since this binding ensures that the key will only be used on the machine that contains that particular TPM. Therefore, in order to certify such a key, the certificate authority has to verify that the key is actually bound to the TPM on a particular machine, and cannot be migrated to other machines. Normally, the process of certifying such a key involves several round-trip exchanges between the certificate authority and the client that is requesting to have the key certified. When a client wants to certify a new non-migratable key that is secured by the client's TPM, the client requests that the TPM create a key called an Attestation Identity Key (AIK) for the new key. The client then asks the certificate authority to certify the AIK, which the certificate authority does after verifying that the AIK was actually generated by the TPM on the client's machine. The client then asks the TPM to sign the new key with the AIK, which the TPM will only do if the key is non-migratable. The client then submits the new key and the AIK-generated signature to the certificate authority. The certificate authority trusts the TPM, and has certified the AIK as belonging to the TPM. Therefore, the certificate authority will trust that the new key is non-migratable based on the TPM's having signed it with the AIK, so the certificate authority will issue a certificate for the new key.

A problem with this process, however, is that it involved multiple round trips between the client and the certificate authority: one trip to certify AIK, and another to certify the new key that the client is trying to certify.

SUMMARY

A non-migratable key may be certified in one round trip between the certificate authority and the client that is requesting the key. On a machine that has a TPM, a client asks the TPM to create a new non-migratable key (e.g., an RSA key pair). The TPM then creates the key and provides the public portion of the new key to the client. The client then creates a certificate request for the new key, and asks the TPM to create an Attestation Identity Key (AIK) that is bound to a digest of the certificate request. The TPM creates the AIK, and returns an identity binding that contains the public portion of the AIK, the digest, and a signature taken over both the public portion of AIK and the digest. The client then asks the TPM to use AIK to sign the public portion of the new key, as an indication that the new key is non-migratable. The TPM signs the public portion of the new key, and returns a key certification structure that contains the new key, the TPM's statement that the new key is non-migratable, and a signature created with the private portion of the AIK. The client then sends to the certificate authority: the certificate request; the identity binding; the key certification structure; and the public key certificate of the TPM's endorsement key. (The endorsement key is the key that each TPM has that identifies a particular TPM.)

When the certificate authority receives these items from the client, it examines the public key certificate of the TPM's endorsement key to verify that the TPM associated with that endorsement key is a TPM that the certificate authority knows and trusts. The certificate authority then examines the certificate to recover the new key that the client is asking to certify. The certificate authority then verifies the signature on the identity binding, calculates the digest of the certificate request, and compares the calculated digest with the digest contained in the identity binding to ensure that the two digests match. If the digests match, and if the signature on the identity binding is valid, these facts prove that the AIK mentioned in the identity binding was created specifically for the certificate request that the certificate authority has received. Assuming that the digests match and the signature on the identity binding verifies correctly, the certificate authority examines key certification structure, and verifies the signature on that structure. The key certification structure represents a statement, made by the party in possession of the private portion of the AIK, that the new key contained in the structure is non-migratable. Thus, if the key certification structure mentions the same key that is in the certificate request, and if the signature verifies, then the certificate authority knows that the party in possession of the private portion of the AIK has said that the key is non-migratable.

At this point, the certificate authority creates a certificate for the new key, and signs the certificate. But, instead of including a clear signature in the certificate, the certificate authority creates a symmetric key and encrypts the signature with the symmetric key. The certificate authority then encrypts the symmetric key with the public endorsement key that it received along with the certificate request, and sends, to the client, the certificate (with the signature encrypted by the symmetric key), along with the symmetric key encrypted by the TPM's public endorsement key. When the certificate authority received the public key certificate for the TPM's endorsement key, it determined that it trusts the particular TPM associated with that endorsement key. As long as that TPM is present at the machine on which the client runs (as opposed to some other TPM with a different endorsement key), the client will be able to decrypt the signature in the certificate by first asking the TPM to use its endorsement key to decrypt the symmetric key, and then using the symmetric key to decrypt the signature. When the client replaces the encrypted signature with the clear signature, the certificate will become usable. If a different TPM is present at the client (e.g., a TPM that is not trusted by the certificate authority), then the TPM will not be able to decrypt the symmetric key because it will not have the endorsement key for which the symmetric key was encrypted. In that case, the client would not be able to decrypt the signature, and the certificate would be unusable.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
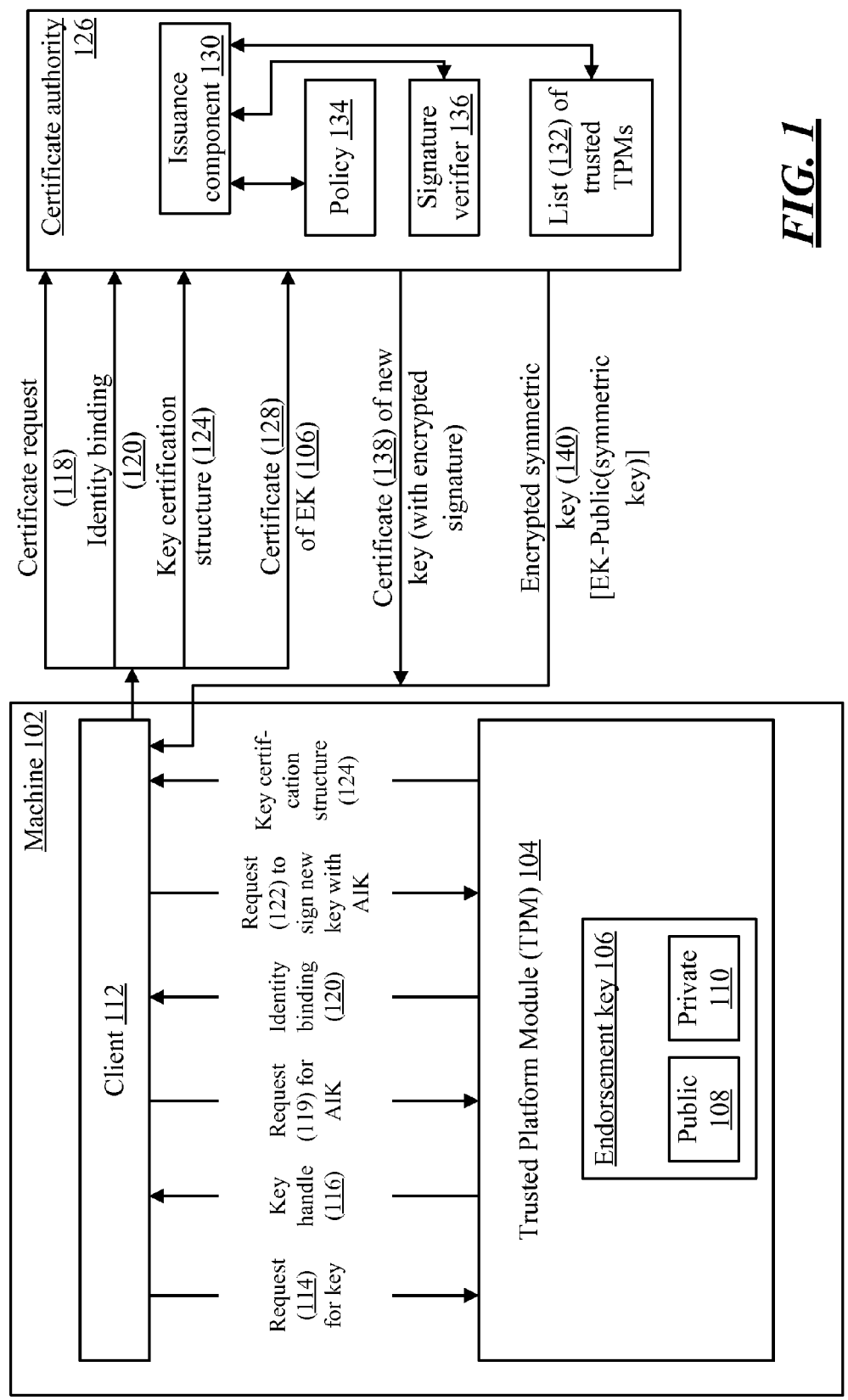
FIG. 1 is a block diagram of various components that may be used when a client requests that a certificate authority certify a key.
Figure 2:
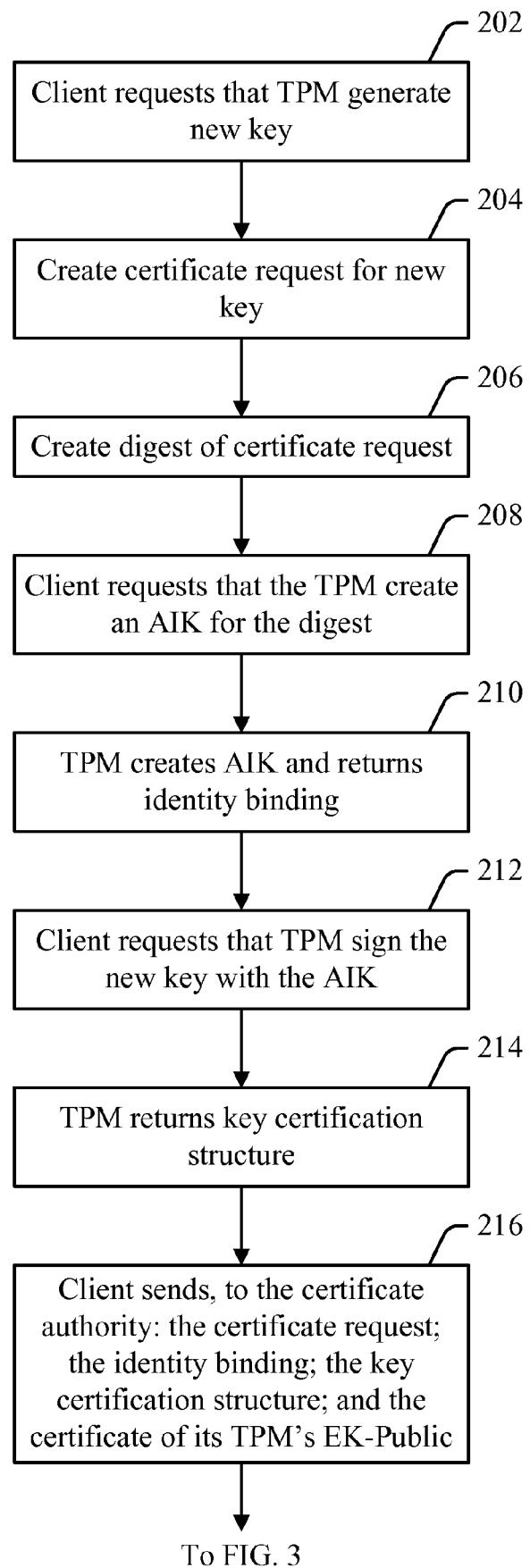
FIGS. 2-5 are, collectively, a flow diagram of an example process in which a request to certify a key may be made and acted upon.
Figure 3:
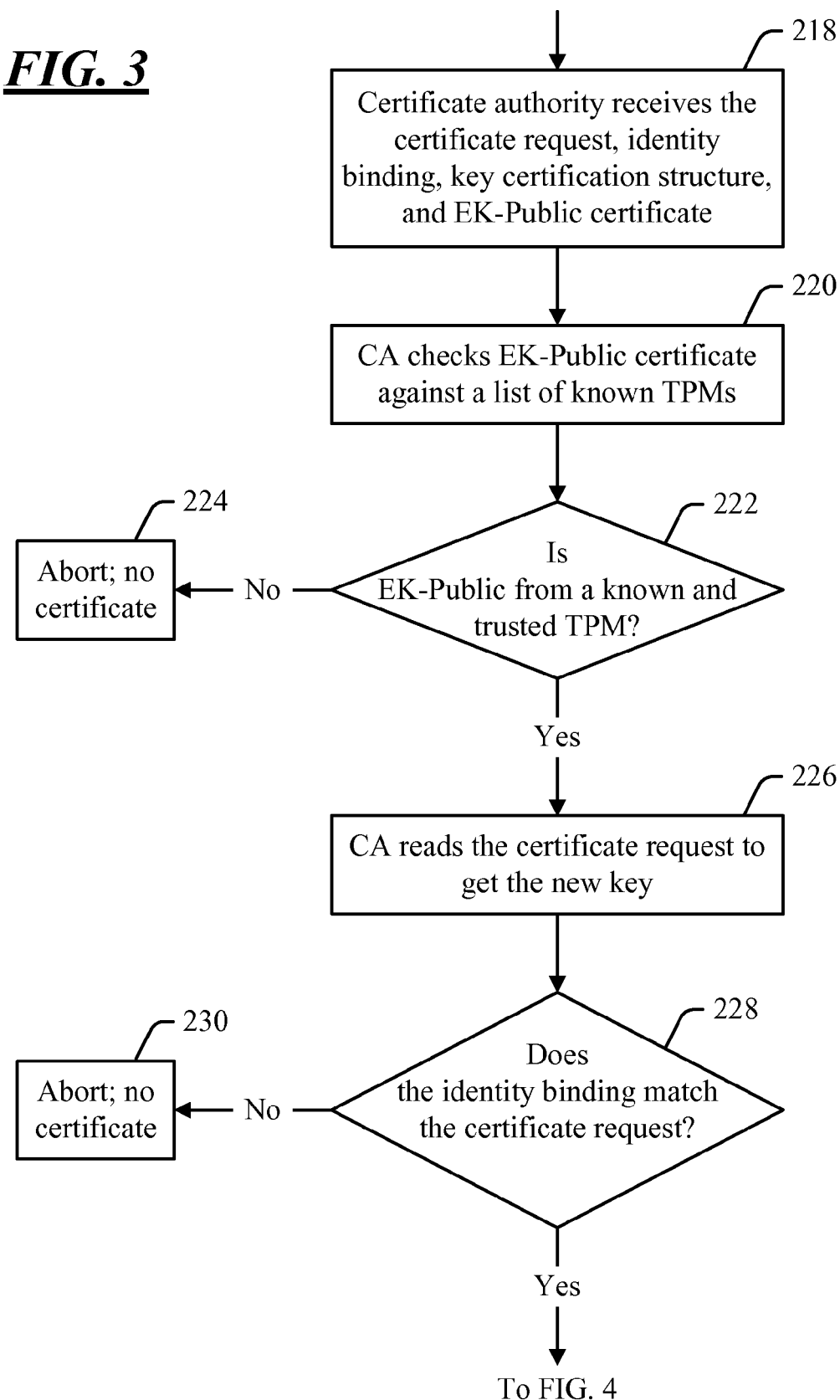
Figure 4:
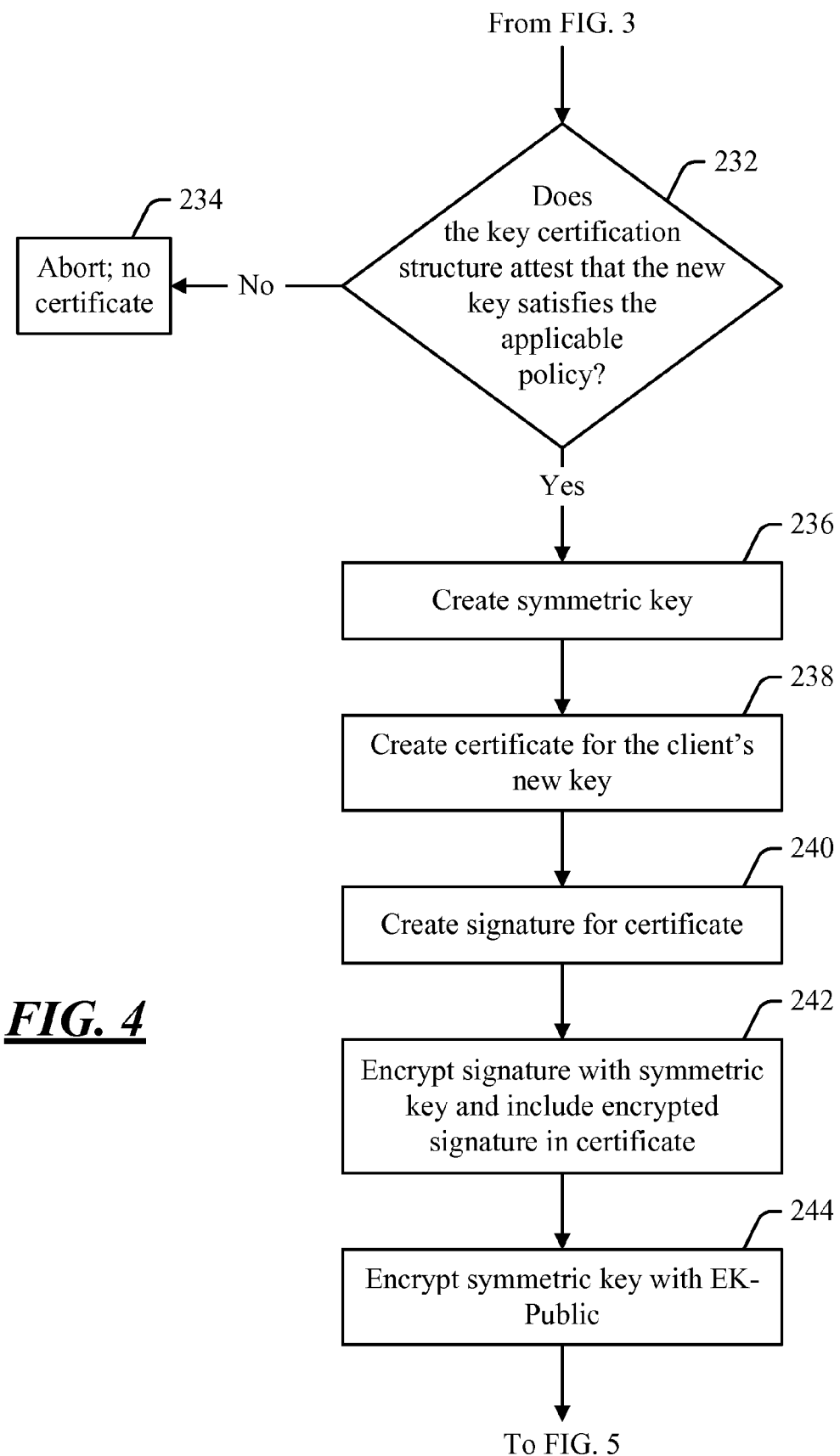
Figure 5:
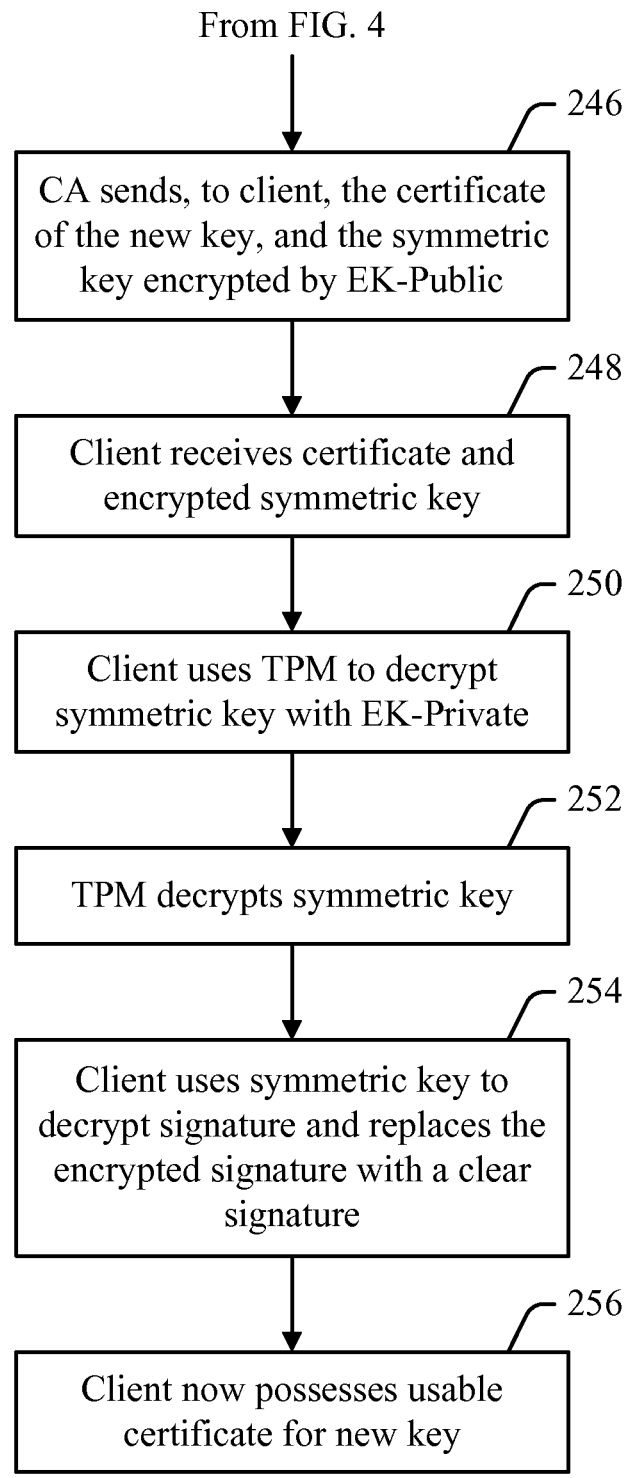

Cryptographic keys are used for various applications in computer security, such as encryption and digital signing. Encryption is the process of encrypting a message with an encryption key so that only the party that possesses the decryption key (which may or may not be the same as the encryption key) can decipher the message. Digital signing is a process whereby an entity (the signer) makes an assertion about a piece of data, and where the signature provides cryptographic-strength assurance that the assertion was actually made by the entity that is in possession of the key.

The encryption and digital signing processes both involve implicit trust relationship between the parties that participate in these processes. For example, when A encrypts data with B's key, A is implicitly trusting: (a) that the key that A believes is B's is really B's key, and (b) encrypting data with B's key and transmitting the encrypted data over an unsecure channel will not cause the encrypted data to be used in some manner that is unacceptable to A. For example, with regard to point (a), A might have received B's key from an unreliable source, so the key that A believes belongs to B might actually be an interloper's key. Or, with regard to point (b) the key might really be B's key, but B might use such lax security measures that the security of the key has become compromised, thereby allowing interlopers to decrypt messages that have been encrypted with B's key. Similarly, when A receives a message purportedly signed by B (e.g., "Fact F is true, signed B"), if A relies on this message then A is implicitly trusting that the message really was signed by B (i.e., that A really knows which key is B's, and that B's key has not been compromised). Additionally, A is also trusting that B would not sign the message "Fact F is true" unless B had verified, up to some level of certainty, that fact F really is true.

When keys are used, trust in the key is generally established by having an authority attest to the trustworthiness of the key. This attestation is represented in the form of a certificate, whereby the authority signs the key as an indication that the authority has found the key to be trustworthy. Of course, reliance on the authority's signature involves the same forms of trust described above, but certificate authorities are generally well-known to the relevant community in which trust is to be established, or involve short trust chains back to well-known authorities. Thus, if an entity wants to use a key for signing or encryption, the entity typically presents the key to an appropriate certificate authority and requests that the authority sign the key. The authority takes whatever measures it deems appropriate to determine that the key is sufficiently trustworthy. For example, the authority may determine what kinds of security measures the requesting entity uses to protect the key (e.g., whether the entity uses hardware or software protection). The authority may inquire what policies the requesting entity will use to determine what can be signed with the key. Or, the authority might only be willing to certify keys for certain types of entities (e.g., the authority could be the certificate authority for a corporation or other enterprise, and might only be willing to certify keys used by machines in that enterprise). If the authority determines that it can certify the key, it issues a certificate that contains the key and the authority's signature. An X.509 certificate is an example of such a certificate.

One way that a machine can help to ensure the trustworthiness of its keys is to employ a Trusted Platform Module (TPM) that is bound to the machine. The TPM is a chip that performs certain cryptographic functions for its host machine. The host machine can leverage these cryptographic functions to provide a rich array of security services. For example, the TPM can seal data to a particular machine execution state, so that the data is only provided to the machine when the machine is in a known, safe state. This technique is often used to protect cryptographic keys on the host. With such a technique, the host uses the TPM to seal a key, and only the sealed key is stored on the machine's disk drive. When the host wants to use the key, the host asks the TPM to unseal the key, which the TPM will only do if the machine is in the execution state to which the key has been sealed. This execution state (which is typically represented by specific values of the Platform Configuration Registers, or "PCRs") has previously been verified to be a safe one that provides sufficient assurance against misuse of the key. Another way that a TPM can provide security for a key is to generate a key pair, and provide only the public portion of the key pair to the host, so that all private key operations involving that key pair are performed inside the TPM. The TPM can provide various assurances as to such a key. For example, the TPM can assure that a key that does not leave the TPM is a non-migratable key (i.e., that the key cannot be used on any platform other than the one that employs the particular TPM that has sealed the key).

Since a non-migratable key is secured by the TPM, the key is quite trustworthy in the sense that it is unlikely to be misappropriated by interlopers, and is unlikely to be misused by malware on the host platform. In order to establish this trustworthiness to members of the relevant community, the host platform may present the non-migratable key to an authority and request that the authority certify the key as an indication of trustworthiness. However, a problem arises in obtaining this certification. Specifically, before issuing a certificate for such a key, the certificate authority has to confirm that the key being presented for signature has actually been secured by the TPM. For example, the host authority might claim to have a non-migratable key. However, before certifying the key as being non-migratable, the certificate authority will insist that the TPM says the key is non-migratable, not merely that the host says so.

Statements, such as "this key is non-migratable", are generally established by the signed statement of a trusted entity. The TPM has a key pair called the "endorsement key" (which is referred to as "EK", and whose public and private portions may be referred to, respectively, as "EK-public" and "EK-private"). A given TPM's endorsement key distinguishes that TPM from other TPMs. The public EK of a TPM is known to certificate authorities that trust that specific TPM. For example, a corporation might operate a server to act as a certificate authority, and that server might know the EK for all the laptops owned by the corporation. Thus, if the host platform creates a key that is sealed by the TPM, in theory the TPM could use EK to sign the key as an indication that the TPM believes the key to be secure. Since the certificate authority knows the public EKs of those TPMs that it knows and trusts, the certificate authority could use the signature to verify that a trusted TPM has attested that the key is non-migratable, and the certificate authority could issue a certificate for the key on that basis. However, in reality, the TPM has policies that prevent it from signing arbitrary data with EK. Thus, a TPM typically uses EK to create other keys, and the TPM uses these other keys to sign data. One example of such an "other key" is an Attestation Identity Key (AIK), which the TPM uses to sign other keys.

Typically, an AIK is used to obtain a certificate of a key in the following way. Software on the host platform asks the TPM to create a new key pair, for which the software receives the public portion. The software then asks the TPM to create an AIK that is bound to the public portion of the new key, and then requests that the certificate authority ("CA") sign the public portion of the AIK (i.e., "AIK-public"). During this process, the CA verifies that the request actually comes from a TPM that it trusts. For example, the CA might verify the security of the communication channel between itself and the TPM by using a nonce. One the CA is convinced that the request to sign AIK came from a TPM that the CA trusts, the CA signs AIK-public and returns the certificate to the host platform. The host platform then generates a new key, and requests that the TPM use the private portion of AIK ("AIK-private") to sign the new key. The use of AIK to sign a new key might represent some statement that the TPM makes about the new key—e.g., signing a new key with AIK might indicate that the TPM asserts the new key is non-migratable. The host then presents to the CA: the new key; the signature; and the CA's certificate of AIK; and a request that the CA sign the new key. The CA uses AIK-public to verify the signature on the new key, and uses the certificate of AIK-public to verify that trust in AIK has previously been established. The CA then issues the new certificate and returns it to the host.

A problem that arises with the foregoing procedure is that it uses multiple round-trips to the CA: one to certify AIK, and then another to certify the key that the TPM has signed with AIK.

The subject matter described herein allows the TPM's host platform to request that a CA certify a TPM-protected key in one round trip. The technique described herein avoids the use of a separate round trip to certify AIK. Instead, a client on the host platform asks the TPM to create a new non-migratable key, and asks the CA to certify the new key without first establishing that the CA trusts the AIK. The CA responds by certifying the key, but in a way that makes subsequent use of the certificate contingent on the host's having a TPM that the CA trusts. In order to perform this procedure, the client asks the TPM to create a new key that the client wishes to have certified. The client then creates a certificate request—i.e., a request to have the CA sign the new key. Before actually sending the request to the CA, the client asks the TPM to create an AIK that is bound to the certificate request. The TPM responds by creating an identity binding, which contains the public portion of the AIK, a digest of the certificate request, and a signature. The client then asks the TPM to sign the new key. The TPM responds by creating a key certification structure, which contains the key to be certified, a statement about the key (e.g., "This key is non-migratable"), and a signature created with AIK-private. The client then forwards the certificate request, the identity binding, the key certification structure, and a certificate of the TPM's EK-public, to the CA.

The CA then examines the certificate of EK-public to ensure that it belongs to a TPM that the CA trusts. The CA then digests the certificate request, compares that digest to the digest contained in the identity binding, and verifies the signature on the identity binding. Assuming that the digests match and that the signature verifies, these facts prove that the AIK was created for the certificate request that the CA received. Next, the CA recovers the key to be certified from the certificate request, and compares it with the key identified in the key certification structure, to ensure that the key certificate structure relates to the key specified in the certificate request. The CA then examines the statement made in the key certification structure to ensure that the statement about the key is consistent with the CA's certificate issuance policy (e.g., if the CA's policy calls for certifying only non-migratable keys, then the CA verifies that the statement attests to the non-migratability of the key). The CA then verifies the signature on the key certification structure to ensure that the statement contained in that structure was made by the holder of AIK-private. Assuming that all of the foregoing verifications are in order, the CA, at this point, knows that the holder of AIK is asserting the new key to be non-migratable and is requesting a certificate for that key.

What the CA does not know is whether AIK is associated with the trusted TPM that is associated with EK-public. Thus, the CA issues, to the client, a conditional certificate. The certificate is conditional in the sense that it can be used only if the TPM that holds EK-private (whom the CA trusts) will verify that AIK was issued by that TPM. In order to make the certificate conditional, instead of signing the certificate in the clear, the CA creates a symmetric key and encrypts its signature of the certificate with the symmetric key. So, the CA provides to the client a certificate that contains the encrypted signature, and also provides the symmetric key encrypted by EK-public. If the AIK that was used for the certificate request was actually created by the trusted TPM that hold EK, then that client will be able to ask the TPM to use EK-private to decrypt the symmetric key, which may be used, in turn, to decrypt the signature on the certificate. Otherwise—if the CA provides the certificate to a client on a machine that does not have the trusted TPM identified by EK-public, then the client will not be able to decrypt the signature, and will not be able to use the certificate. In this way, the CA delegates to a trusted TPM the job of verifying the trustworthiness of a particular AIK, thereby avoiding a separate round between the certificate authority and the client to have the AIK certified.

Turning now to the drawings, FIG. 1 shows various components that may be used when a client requests that a certificate authority certify a new key, and the example interactions between those components. In the drawings, and in the description that follows, the key that the client is requesting to certify is referred to as the "new key." In one example, this key is the public portion of a Rivest-Shamir-Adelman (RSA) key that the client will use as part of a process to sign data. Thus, in a typical scenario, the client creates a new RSA signing key and is seeking to have the key certified by the CA so that the signing key can be trusted by other entities. However, the techniques described herein are not limited to the certification of signing keys, or RSA keys. In general, the techniques herein apply whenever a client creates a key and is seeking to have it certified by a CA. Thus, the key that the client is seeking to have certified will be referred to herein as the "new key." The techniques described herein involve the use of various keys, and those keys will be distinguished in the text and drawings by appropriate labels and/or modifiers.

Machine 102 is a machine that provides some computing capability, such as a personal computer, a handheld computer, a set-top box, etc. Machine 102 is equipped with TPM 104. TPM 104 is a component that provides various security services for machine 102 on which TPM 104 is located. TPM 104 has an endorsement key (EK) 106, which is an asymmetric key pair that has respective public and private portions 108 and 110, respectively (referred to herein as "EK-Public" and "EK-Private"). Each TPM 104 has its own EK that is not shared by other TPMs. One aspect of EK 106 is that EK-Private is not exposed outside of TPM 104. TPM 104 exposes an interface that machine 102 can use to request that TPM 104 decrypt a piece of data with EK-Private, so that TPM 104 can decrypt data for machine 102 without exposing the actual value of EK-Private. TPM 104 also provides various other security functions. For example, TPM 104 maintains a set of registers (called Platform Configuration Registers, or PCRs) that record a measurement of the current execution state of the machine, and TPM 104 allows machine 102 to seal pieces of data to a specific machine state. In this way, machine 102 can hold a piece of sealed data that only TPM 104 can unseal, and TPM 104 can protect this data by refusing to unseal the data unless machine 102 is currently in a known "safe" state. Another feature provided by TPM 104 is a small amount of memory inside of TPM 104 that can be used to store keys. Thus, TPM 104 can generate key pairs and can hold the private portion of the key in its own memory so that the private portion is not exposed to the non-secure portions of machine 102 (i.e., those portions of machine 102 that are outside of TPM 104). In this sense, a key pair whose private key is held inside TPM 104 is a non-migratable key: it cannot be migrated to other machines, because it is not exposed outside of a specific machine's TPM.

Client 112 is a software component that wants to create a new key for some purpose (e.g., signing or encryption). Client 112 could be an application, a component of an operating system, or any other type of software component that runs on machine 102. When client 112 decides to create a new key, client 112 issues a request 114 that TPM 104 create the key. TPM 104 creates the requested key and returns a key handle 116 by which the key can be identified. Typically, request 114 is a request to create an asymmetric key pair, such as an RSA key pair, in which case key handle 116 contains the public portion of the new key (the private portion being kept only inside of TPM 104). In this example, the public portion of the RSA key pair is the "new key" that the client is seeking to have certified. (Technically, it is the private key that is used to sign data, and the public key is used by other parties to verify the signature. Since data is signed with the expectation that someone will later verify the signature, for purposes herein the public key can be considered to be "part of the process" of signing data.)

In order to have the new key certified, client 112 creates a certificate request 118, which is a formal data structure that requests that a certificate authority certify a key. Client 112 does not send certificate request 118 to a certificate authority at this point. Before doing so, client 112 arranges to have various pieces of data created by the TPM to send along with the certificate request. These various pieces of data are described below.

Figure 6:
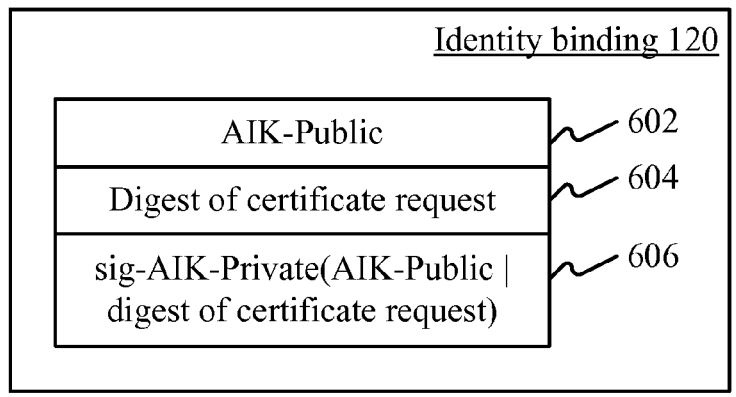
FIG. 6 is a block diagram of an example identity binding.

First, client 112 issues, to TPM 104, a request 119 for an Attestation Identity Key (AIK). TPM 104 exposes a function that creates an AIK bound to an arbitrary piece of data. For example, TPM 104 might expose a function such as "CreateAIK(blob)", which returns an AIK in a way that is cryptographically bound to "blob" (where "blob" is an arbitrary piece of data). Specifically, when client 112 issues the request "CreateAIK(blob)", TPM 104 returns a piece of data of the form:

AIK-Public|blob|sig-AIK-Private (AIK-Public|blob)
(As a matter of notation, the vertical bar symbol "|" refers to concatenation. Additionally, throughout this description the notation "sig-<key-pair>-Private(<data>)" will refer to a signature that is created over <data> by using the private portion of <key pair>.) When client 112 requests the AIK from TPM 104, the "blob" that client requests that the AIK be bound to is a digest of certificate request 118. The data returned by the AIK-creation function is referred to as an identity binding 120, and an example of identity binding 120 is shown in FIG. 6. Specifically, identity binding 120 contains AIK-Public 602, a digest 604 of the certificate request, and a signature 606 that is taken over AIK-Public 602 and digest 604, where signature 606 is created using AIK-Private. Thus, the identity binding 120 that client 112 receives from TPM 104 is:

AIK-Public|digest|sig-AIK-Private(AIK-Public|digest)
What the identity binding does is to bind the AIK to a specific certificate request (by way of the digest of that request). In effect, the signature means that the holder of AIK-Private (which is TPM 104) asserts that "digest" is the data for which the AIK was created. Any party that has identity binding 120 can use AIK-Public to verify the signature.

Returning to FIG. 1, client 112 next issues, to TPM 104, a request 122 to have the new key signed with the AIK. When TPM 104 signs a key with AIK, TPM 104 returns a structure that indicates the security features that apply to the key. For example, as described above, the new key that client 112 is seeking to have certified by a CA was created by the TPM. In the example where the new key is a key pair, TPM 104 holds the private portion inside of TPM 104, and does not divulge the private portion outside of TPM 104. In this sense, the new key is non-migratable since its private portion cannot be used on any machine other than the specific machine (i.e., machine 102) that contains TPM 104. Thus, when TPM 104 signs a key with AIK, it returns a structure that, in effect, contains the following information:

statement|new key|sig-AIK-Private(statement|new key)
where "statement" is a statement about the new key. For example, statement may say, in effect, "The key that is being signed is a non-migratable key." (The example of a statement that is written out in the form of an English sentence is merely for illustration. Typically the statement may be made using a code. Or, if TPMs have a known policy of refusing to sign a key unless the key meets a particular security standard, then the statement could be implicit in the fact that the TPM signed the key. Additionally, it is noted that "non-migratability" is an example feature of a key, and this example is used throughout the description herein. Thus, the description frequently refers to a key as having the feature of being non-migratable, or the AIK being used to sign the statement that the key is non-migratable, or the CA checking that the key meets a policy of non-migratability. However, non-migratability is merely an example of such a feature. In general, a key could have any feature, the statement contained in the key certification structure could attest to any such feature, and the CA could impose a policy that calls for a key to have any set of zero or more features. Thus, while the description herein refers to non-migratable keys, it will be understood that the key certification structure merely attests to some feature of the key, regardless of what that feature is, and the CA, as discussed below, may use the key certification structure to determine whether AIK-Private has been used to attest to whatever feature the CA's policy calls for.)

Figure 7:
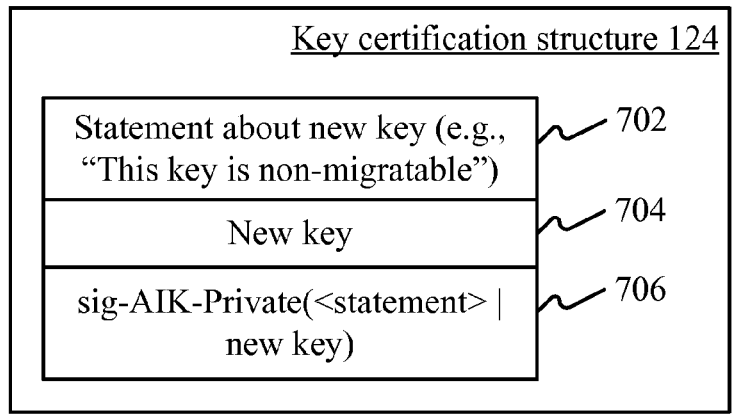
FIG. 7 is a block diagram of an example key certification structure.

Thus, when TPM 104 signs the key, it produces a key certification structure 124, an example of which is shown in FIG. 7. The example key certification structure 124 contains statement 702 (which may be expressed either explicitly as shown, or may be expressed implicitly). Key certification structure 124 also contains the new key 704 to be certified, and a signature 706, which is created using AIK-Private and is calculated over the statement and the new key. Key certification structure 124 proves that whatever entity controls AIK-Private says that new key 704 is a non-migratable key (or has whatever feature the holder of AIK-Private is attesting to). Any entity in possession of AIK-Public (i.e., any entity that has received the identity binding described above) can use the signature to prove that new key 704 and statement 702 were signed by the entity in possession of AIK-Private.

Returning to FIG. 1, certificate authority (CA) 126 is the entity that client 112 wants to ask to certify the new key. Client 112 is now ready to request a certificate from CA 126. In order to request that CA 126 certify the new key, client 112 sends, to CA 126: the certificate request 118; the identity binding 120; the key certification structure 124, and a certificate 128 of EK 106 (i.e., the public key certificate of TPM 104's endorsement key, which contains EK-Public). These items are received by CA 126.

In one example, CA 126 is a server that acts on requests to issue certificates. For example, CA 126 may be a server within a corporation (or other enterprise) that enrolls new machines in the enterprise by certifying their keys. CA 126 includes an issuance component 130, which makes decisions about which keys to certify. CA 126 may contain a list 132 of trusted TPMs (e.g., a list of the EK-publics of those TPMs that CA 126 trusts). CA 126 may also have a policy 134 that contains the rules under which certificate requests are to be granted or denied. For example, CA 126 might have a policy of only certifying non-migratable keys, or might have some other policy. Additionally, CA 126 may have a signature verifier 136 which allow it to verify cryptographic signatures on the various pieces of data that it receives. These components may be used by issuance component 130. For example, issuance component may use signature verifier 136 to verify the signatures on identity binding and key certification structure. Issuance component 130 may also use list 132 of trusted TPMs to determine which TPMs it is willing to certify keys for. Additionally, issuance component 130 may use policy 134 to determine whether it will certify a particular key, even if the certificate request comes from a trusted TPM. (E.g., issuance component might trust TPM 104, but might be unwilling to certify a key for TPM 104 if TPM 104 will not say that the key is non-migratable.)

When CA 126 receives the above-described items from client 112, it does the following. First, CA 126 examines certificate 128 (which contains the public portion of TPM 104's endorsement key) to determine whether CA 126 knows and trusts the TPM on the machine that client 112 is running on. For example, if TPM 104 is unknown to CA 126 (which may be determined by comparing certificate 128 with list 132), then CA 126 may be unwilling to certify a key on the machine on which TPM 104 is installed. Thus, if certificate 128 indicates that the key for which certification is being sought is bound to an unknown TPM, CA 126 may deny the certificate request.

Assuming that CA 126 knows and trusts the TPM whose public endorsement key appears in certificate 128, CA 126 then examines certificate request 118 to recover the new key that client 112 is requesting to certify (since that key is contained in the certificate request).

Next, CA 126 examines identity binding 120 to find the digest of the certificate request. CA 126 then calculates a digest of the certificate request (using the same digest algorithm that was used to create the digest in identity binding 120), and verifies that the digest contained in identity binding matches the digest that CA 126 calculated. If the digests match, then CA 126 reads AIK-Public from identity binding 120, and uses AIK-Public to verify the signature on identity binding 120. It will be recalled that an AIK is bound to a specific piece of data at the time of its creation. Verification of the signature proves that the piece of data for which this particular AIK was created is the digest of certificate request 118. To the extent that the digest process is secure, the fact that AIK was created for the digest proves that the AIK was created for certificate request 118. It is noted that, if the verification process had failed (i.e., if the AIK was created for some certificate request other than the one that is currently being made), this fact would suggest that the certificate request was being made as part of some type of replay attack, and CA 126 could deny the request.

Next, CA 126 examines the key certification structure to determine what statement the holder of AIK-Private is making about the new key contained in the security request. CA 126 uses AIK-Public to verify the signature on the key certification structure. If the signature does not verify, then CA 126 cannot conclude that the holder of AIK-Private has made any particular statement about CA 126, so CA 126 denies the certificate request. Assuming the signature verifies, CA 126 determines whether the properties of the new key are consistent with CA 126's policy 134. For example, if CA 126 has a policy of certifying only non-migratable keys, then it may insist that key certification structure show that the holder of AIK-Private says the key is non-migratable.

Up to this point, the description of the process has referred to the "holder of AIK-Private" without identifying what entity actually holds that key. AIK-Private is, in fact, held by TPM 104, since it is TPM 104 that created the AIK. However, that fact is unknown to CA 126. CA 126 knows the public portion of TPM 104's endorsement key, but CA 126 cannot deduce the relationship between a particular TPM and a particular AIK merely from the endorsement key. In other words, at this point in the process, CA 126 knows that some entity has created an AIK for the specific certificate request that CA 126 received, and that whoever that entity is has made a statement about the key to be certified that satisfies CA 126's issuance policy. But CA 126 does not know who the entity is. As described above, CA 126 has examined TPM 104's public endorsement key and has determined that TPM 104 is trustworthy, so CA 126 would be willing to grant the certificate request if the entity that controls AIK-Private is TPM 104. But CA 126 does not know whether AIK-Private is controlled by TPM 104, or by some other entity. As described below, CA 126 can issue a conditional certificate in a form that can only be used if the entity that controls AIK-Private is actually TPM 104. Specifically, the form of the certificate is such that TPM 104 would have to perform some action, before the certificate could be used. In particular, the signature on the certificate can be encrypted in a way that is only decryptable as a result of a process performed by the TPM (e.g., decryption of the signature by the TPM, or decryption by the TPM of a key that is later used to decrypt the signature).

Figure 8:
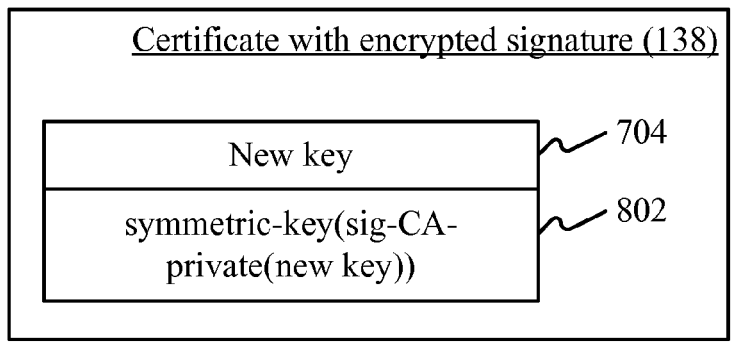
FIG. 8 is a block diagram of an example certificate with an encrypted signature.

In order to issue a certificate that is conditional on the presence of a particular TPM, CA 126 creates a certificate (e.g., an X.509 certificate) for the new key, as requested. A certificate contains the key to be certified, and the signature of the certificate authority that certifies the key. Normally, the signature would be in the certificate in the clear (i.e., not encrypted). However, when CA 126 creates the certificate, it creates a symmetric key, and uses the symmetric key to encrypt the signature. The encrypted signature is placed in the certificate instead of a clear signature. CA 126 then encrypts the symmetric key with the public endorsement key of TPM 104 (i.e., EK-Public, which CA 126 received in certificate 128). Only the holder of EK-Private (i.e., TPM 104) can decrypt information that is encrypted with EK-Public, so only TPM 104 will be able to recover the symmetric key. Therefore, CA 126 sends, to client 112: (a) a certificate 138 with an encrypted signature, and (b) the encrypted symmetric key 140 (encrypted by EK-Public). When client 112 receives the encrypted symmetric key, it can ask TPM 104 to decrypt it with EK-public, thereby allowing client 112 to decrypt the signature with the symmetric key. Client 112 can then substitute the encrypted signature in certificate 138 with the clear signature. Certificate 138 is shown in FIG. 8. Certificate 138 contains new key 704, together with encrypted signature 802 which is sig-CA-Private(new key), encrypted by the symmetric key. ("CA-Private" is the private key of CA 126.)

It is noted that CA 126 only wants to issue a usable certificate if TPM 104 has attested that the key that CA 126 is certifying meets the applicable standard imposed by CA 126 (e.g., non-migratability), which CA 126 knows to be true only if TPM 104 is actually the entity that generated the AIK. In theory, AIK could have been generated by some entity other than TPM 104. In that case, CA 126 would still issue certificate 138 with an encrypted signature that TPM 104 could decrypt (since the signature is encrypted with a symmetric key that can be recovered with TPM 104's private endorsement key). However, when CA 126 sends the certificate with the encrypted signature to TPM 104, CA 126 relies on TPM 104 not to create the certificate with a clear signature unless the new key certified by certificate 138 is actually the one that TPM 104 signed with AIK. In effect, CA 126 delegates this determination to TPM 104, which CA 126 can do because it has already established that TPM 104 is a TPM that CA 126 trusts. Thus, after TPM 104 receives certificate 138 with an encrypted signature, TPM 104 determines whether the new key certified by certificate 138 is a key that TPM 104 has signed with the AIK. If so, then TPM 104 decrypts the signature and replaces the encrypted signature with a clear signature. Otherwise, TPM 104 does not decrypt the signature, thereby rendering the certificate unusable. No party will trust a key certificate unless the party can verify that the certificate was signed by an appropriate authority that the party trusts. If the signature in the certificate cannot be decrypted, the certificate remains effectively unusable, since it could not be used to establish trust with any party.

FIGS. 2-5 show, in the form of a flow chart, an example process by which a request to certify a key may be made and acted upon. Before turning to a description of FIGS. 2-5, it is noted that the flow diagram contained in these figures is described, by way of example, with reference to components shown in FIG. 1, although this process may be carried out in any system and is not limited to the scenario shown in FIG. 1. Additionally, each the flow diagram in FIGS. 2-5 shows an example in which stages of a process are carried out in a particular order, as indicated by the lines connecting the blocks, but the various stages shown in these diagrams can be performed in any order, or in any combination or sub-combination.

At 202, a client requests that the TPM generate a new key. As noted above, the new key may be, for example, an RSA key pair, which may be used for any cryptographic function such as encryption or signing. In the example where an RSA key pair is generated, the "new key" referred to in the flow diagram (i.e., the key to be certified) is the public portion of the key pair.

At 204, a certificate request for the new key is created. A digest of the request is created (at 206), and the client then requests that the TPM create an AIK that is bound to the digest (at 208). The TPM then creates the AIK (at 210), and returns an identity binding. As noted above, the identity binding contains the AIK-Public, the digest, and a signature taken over AIK-Public and the digest (with the signature being created with AIK-Private).

At 212, the client requests that the TPM sign the new key with AIK. The TPM then returns a key certification structure (at 214), which contains (an explicit or implicit) statement about the new key (e.g., "This key is non-migratable"), the new key itself, and a signature taken over the statement and the new key (with the signature being created with AIK-Private). At 216, the client sends to the CA: (a) the certificate request; (b) the identity binding; (c) the key certification structure; and (d) the public key certificate of the TPM's endorsement key (EK-Public). At 218, these items are received by the CA.

At 220, the CA checks EK-Public against a list of known TPMs. If, based on EK-Public, the CA determines that the TPM associated with EK-Public either is not known to the CA or is known to be from an untrustworthy TPM (as determined at 222), then the CA aborts the process (at 224), and does not issue a certificate. If EK-Public is from a known, trusted TPM, then the process continues to 226, where the CA reads the certificate request to get the new key that it is being asked to certify.

The CA then verifies the signature on the identity binding, recovers the digest from the binding, and also calculates the digest itself from the certificate request. If the identity binding does not match the certificate request (i.e., if the digest contained in the certificate request is not the same as the digest that the CA calculated from the certificate request, as determined at 228), then the process aborts, and the CA does not issue a certificate (at 230). Otherwise, the process continues to 232.

At 232, the CA determines whether the key certification structure attests that the new key satisfies the applicable policy (e.g., a policy of non-migratability). The CA may make this determination, for example, by verifying the signature on the key certification structure, and then examining the statement that the structure makes about the key. If the signature fails to verify, or if the statement indicates that the key does not satisfy the CA's policy to certify a key, then the process aborts, and the CA does not issue a certificate (at 234). Otherwise, the process continues to 236, where the CA proceeds to issue a certificate.

At 236, the CA creates the symmetric key that will be used to encrypt the signature on the certificate. At 238, the CA creates the certificate for the new key. At 240, the CA creates the signature for the certificate. At 242, the CA encrypts the signature with the symmetric key, and includes the encrypted signature (instead of a clear signature) in the certificate. At 244, the CA encrypts the symmetric key with EK-Public (the public portion of the endorsement key of the TPM on the machine to which the certificate is to be issued). At 246, the CA sends, to the client that requested the certificate, the certificate of the key (with the encrypted signature), and the symmetric key encrypted by EK-Public. At 248, these items are received by the client.

At 250, the client asks the TPM to decrypt the symmetric key with EK-Private. Assuming that the key contained in the certificate is the same one that the TPM signed with the AIK that was used for the certificate request, the TPM decrypts the symmetric key (at 252) and returns it to the client. The client then uses the symmetric key to decrypt the signature, and replaces the encrypted signature in the certificate with a clear signature (at 256). The client now possesses a usable certificate for the new key (at 258).

Figure 9:
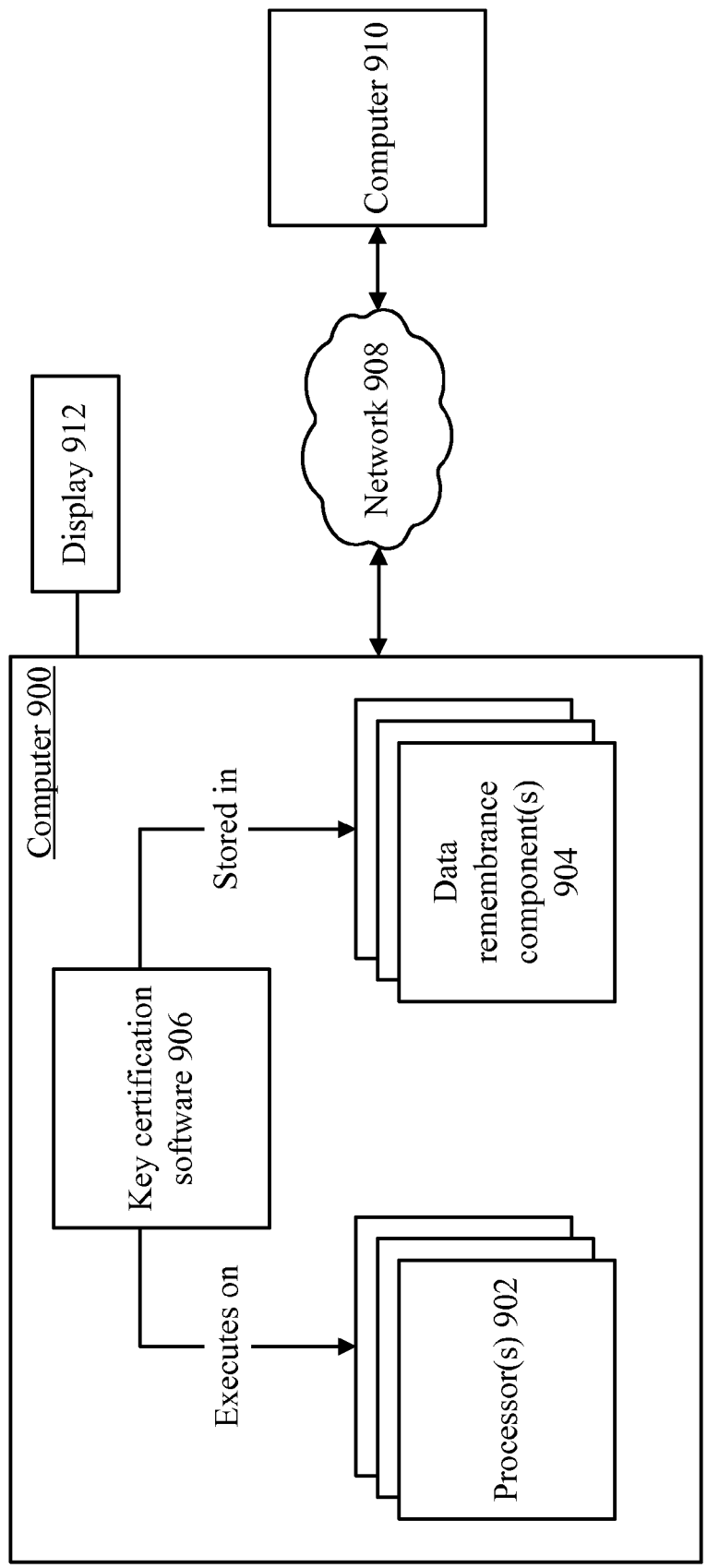
FIG. 9 is a block diagram of example components that may be used in connection with implementations of the subject matter described herein.

FIG. 9 shows an example environment in which aspects of the subject matter described herein may be deployed.

Computer 900 includes one or more processors 902 and one or more data remembrance components 904. Processor(s) 902 are typically microprocessors, such as those found in a personal desktop or laptop computer, a server, a handheld computer, or another kind of computing device. Data remembrance component(s) 904 are components that are capable of storing data for either the short or long term. Examples of data remembrance component(s) 904 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 900 may comprise, or be associated with, display 912, which may be a cathode ray tube (CRT) monitor, a liquid crystal display (LCD) monitor, or any other type of monitor.

Software may be stored in the data remembrance component(s) 904, and may execute on the one or more processor(s) 902. An example of such software is key certification software 906, which may implement some or all of the functionality described above in connection with FIGS. 1-8, although any type of software could be used. Software 906 may be implemented, for example, through one or more components, which may be components in a distributed system, separate files, separate functions, separate objects, separate lines of code, etc. A personal computer in which a program is stored on hard disk, loaded into RAM, and executed on the computer's processor(s) typifies the scenario depicted in FIG. 9, although the subject matter described herein is not limited to this example.

The subject matter described herein can be implemented as software that is stored in one or more of the data remembrance component(s) 904 and that executes on one or more of the processor(s) 902. As another example, the subject matter can be implemented as instructions that are stored on one or more computer-readable storage media. (Tangible media, such as an optical disks or magnetic disks, are examples of storage media.) Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 902) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 900 may be communicatively connected to one or more other devices through network 908. Computer 910, which may be similar in structure to computer 900, is an example of a device that can be connected to computer 900, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage devices that store executable instructions to request a certificate of a first key, wherein the executable instructions, when executed by a computer, cause the computer to perform acts comprising: creating a certificate request to have said first key certified; requesting, from a trusted platform module, an attestation identity key bound to said certificate request; receiving, from said trusted platform module, an identity binding that binds said attestation identity key to said certificate request; requesting that said trusted platform module sign said first key with said attestation identity key; receiving, from said trusted platform module, a key certification structure that contains said first key and that is signed by said attestation identity key; sending, to a certificate authority and without first establishing that said certificate authority trusts said attestation identity key, information that comprises said certificate request, said identity binding, said key certification structure, and a first certificate of said trusted platform module's public endorsement key; and receiving, from said certificate authority, a second certificate of said first key, said second certificate being in a form that is usable only after action is taken by said trusted platform module to verify for said certificate authority that said certificate authority trusts said attestation identity key.

2. The computer-readable storage devices of claim 1, wherein said acts further comprise: calculating a digest of said certificate request; wherein said attestation identity key is bound to said certificate request by binding said attestation identity key to said digest.

3. The computer-readable storage devices of claim 1, wherein said first certificate comprises a signature of said certificate authority, said signature being decryptable only by a process that uses said trusted platform module's private endorsement key, wherein said action comprises use of said trusted platform module's private endorsement key.

4. The computer-readable storage devices of claim 3, further comprising: receiving, from said certificate authority, a symmetric key encrypted by said trusted platform module's public endorsement key; wherein said second certificate contains said signature in a form encrypted by said symmetric key, and wherein said process that uses said trusted platform module's private endorsement key comprises: using said trusted platform module's private endorsement key to decrypt said symmetric key; and using said symmetric key to decrypt said signature.

5. The computer-readable storage devices of claim 1, wherein said second certificate comprises a signature received in an encrypted form, and wherein said acts further comprise: replacing said signature in said encrypted form with a signature in a clear form.

6. The computer-readable storage devices of claim 1, wherein said first key comprises a public portion of a Rivest-Shamir-Adelman (RSA) key pair.

7. The computer-readable storage devices of claim 1, wherein said first key is non-migratable, and wherein said key certification structure comprises a statement that said first key is non-migratable.

8. The computer-readable storage devices of claim 1, wherein said first key is used as part of a process of signing data on a machine on which said trusted platform module is located.

9. A method of acting on a request to certify a first key, the method comprising:
  using a processor to perform acts comprising:
    receiving, from a client, information that comprises:
      a certificate request to certify a first key;
      an identity binding of an attestation identity key created by a trusted platform module on a machine on which said client executes;
      a key certification structure that uses said attestation identity key to attest to a feature of said first key; and
      a first certificate of said trusted platform module's public endorsement key;
    verifying, based on said public endorsement key, that said trusted platform module is trusted by a certificate authority that performs said acts;
    verifying that said identity binding binds said attestation identity key to said certificate request;
    verifying that said key certification structure represents a statement, by a holder of a private portion of said attestation identity key, that said first key has said feature; and
    sending, to said client, a second certificate of said first key, wherein use of said second certificate is conditional on presence of said trusted platform module and without first establishing trust of said attestation identity key in order to delegate to said trusted platform module a task of verifying that said attestation identity key is trustworthy.

10. The method of claim 9, wherein use of said second certificate is made conditional on presence of said trusted platform module by making said certificate usable only after use of said trusted platform module's private endorsement key.

11. The method of claim 9, wherein said second certificate comprises a signature of said certificate authority, said signature being in a form that is decryptable only with use of said trusted platform module's private endorsement key.

12. The method of claim 9, wherein said second certificate comprises a signature of said certificate authority, said signature being encrypted with a symmetric key, and wherein said acts further comprise:
  sending, to said client, said symmetric key encrypted by said trusted platform module's public endorsement key.

13. The method of claim 9, wherein said feature comprises said first key's being non-migratable, and wherein said key certification structure contains an explicit or implicit statement that said first key is non-migratable.

14. The method of claim 9, wherein said first key comprises a public portion of a Rivest-Shamir-Adelman (RSA) key pair.

15. The method of claim 9, wherein said first key is used by said platform as part of a process of encrypting or signing data.

16. The method of claim 9, wherein said identity binding binds said attestation identity key to said certificate request by containing a first digest of said certificate request, and wherein said acts further comprise:
  calculating a second digest of said certificate request; and
  verifying that said second digest matches said first digest.

17. A system for obtaining a certificate of a first key, the system comprising:
  a memory;
  a processor;
  a trusted platform module (TPM) that is associated with an endorsement key pair that distinguishes said TPM from other TPMs;
  a client that is stored in said memory and that executes on said processor, that requests that said TPM create a first key, that creates a certificate request to have said first key certified by a certificate authority, that requests that said TPM create an identity binding that binds an attestation identity key to said certificate request, that requests that said TPM create a key certification structure that signs said first key with said attestation identity key, that that sends said certificate request, said identity binding, said key certification structure, and a first certificate of said TPM's public endorsement key to said certificate authority without first establishing that said certificate authority trusts said attestation identity key, and that receives from said certificate authority a second certificate of said first key, said second certificate being usable only after action by said TPM to verify for said certificate authority that said certificate authority trusts said attestation identity key.

18. The system of claim 17, wherein said action by said TPM comprises said TPM's use of said TPM's private endorsement key.

19. The system of claim 17, wherein said second certificate comprises a signature of said certificate authority in a form that is encrypted by a symmetric key, wherein said client receives, from said certificate authority, said symmetric key encrypted by said TPM's public endorsement key, wherein said client requests that said TPM decrypt said symmetric key with said TPM's private endorsement key, and wherein said client uses said symmetric key to decrypt said signature and replaces the encrypted signature with a clear signature in said second certificate.

20. The system of claim 17, wherein said first key is not migratable from a machine at which said TPM is present, and wherein said TPM signs said first key with said attestation identity key as an indication that said first key is non-migratable.

* * * * *